United States Patent [19]

Wallace et al.

[11] Patent Number: 5,610,438

[45] Date of Patent: Mar. 11, 1997

[54] MICRO-MECHANICAL DEVICE WITH NON-EVAPORABLE GETTER

[75] Inventors: Robert M. Wallace, Dallas, Tex.; Douglas A. Webb, Phoenix, Ariz.

[73] Assignee: Texas Instruments Incorporated, Dallas, Tex.

[21] Appl. No.: 401,048

[22] Filed: Mar. 8, 1995

[51] Int. Cl.$^6$ ................................................. H01L 23/18
[52] U.S. Cl. .......................... 257/682; 257/729; 359/896
[58] Field of Search .................................. 257/678, 680, 257/913, 729, 417–419, 682; 359/846, 896, 894

[56] References Cited

U.S. PATENT DOCUMENTS

| Re. 31,388 | 9/1983 | Hellier et al. | 417/48 |
|---|---|---|---|
| 3,600,798 | 8/1971 | Lee | 29/592 |
| 3,886,310 | 5/1975 | Guldberg et al. | 178/7.5 D |
| 3,896,338 | 7/1975 | Nathanson | 315/373 |
| 3,920,355 | 11/1975 | Zucchinelli | 417/49 |
| 3,927,953 | 12/1975 | Zucchinelli | 417/48 |
| 3,949,460 | 4/1976 | della Prota et al. | 29/428 |
| 3,961,897 | 6/1976 | Giorgi et al. | 23/252 |
| 3,973,157 | 8/1976 | Giorgi et al. | 313/353 |
| 3,975,304 | 8/1976 | della Porta et al. | 252/463 |
| 3,979,166 | 9/1976 | Zucchinelli | 417/48 |
| 3,980,446 | 9/1976 | della Porta et al. | 29/191.4 |
| 3,996,488 | 12/1976 | Zucchinelli | 313/174 |
| 4,029,987 | 6/1977 | Zucchinellli | 313/174 |
| 4,045,369 | 8/1977 | Cantaluppi | 252/432 |

(List continued on next page.)

OTHER PUBLICATIONS

Minami et al. "Cavity Pressure Control For Critical Damping of Packaged Micro Mechanical Devices", Transducers '95, 8th Int. Conf. On Solid State Sensors and Actuators, and Eurosensors IX, Stockholm Sweden, Jun. 25–29, 1995.

U.S. Serial #08/220,429, filed Mar. 30, 1994.
U.S. Serial #08/216,194 filed Mar. 21, 1994.
TI–18478 entitled "PEPE Coatings for Micro–Mechanical Devices" 22 pages.
TI Docket # TI–18470 entitled "Use of Incompatable Materials To Eliminate Sticking of Micromechanical Devices," 15 pages.
TI Docket # TI–18468 entitled "Polymeric Coatings for Micromechanical device", 21 pages.
TI Docket # TI–18388 entitled "Manufactue Method for Micromechanical Devices", 16 pages.
Lorimer, et al "Enhanced UHV Performance with Zirconium–Based Getters" Solid State Technology, Sep. 1990, pp. 77–80.
Giorgi, et al "An updated review of getters and gettering" J. Vac. Sci. Technology, vol. 3, No. 2 Mar./Apr. 1985 pp. 417–423.
Giorgi, T. A. "Getters and Gettering" Proc. 6th Internl. Vacuum Congr. 1974, Japan.J.Appl. Phys. Suppl. 2, Pt. 1, 1974, pp. 53–60.
Ferrario, B. "A New Generation of Porous Non–Evaporable Getters", SAES Getters S.p.A., Via Gallarate 215, 20151 Milan–Italy, pp. 1–9.
U.S. Serial #08/311,480, filed Sep. 23, 1994.
U.S. Serial #08/239,497, filed May 9, 1994.

*Primary Examiner*—Peter Toby Brown
*Attorney, Agent, or Firm*—Robert C. Klinger; James C. Kesterson; Richard L. Donaldson

[57] ABSTRACT

The present invention relates to micro-mechanical devices including actuators, motors and sensors with improved operating characteristics. A micro-mechanical device (10) comprising a DMD-type spatial light modulator with a getter (100) located within the package (52). The getter (100) is preferably specific to water, larger organic molecules, various gases, or other high surface energy substances. The getter is a non-evaporable getter (NEG) to permit the use of active metal getter systems without their evaporation on package surfaces.

16 Claims, 2 Drawing Sheets

U.S. PATENT DOCUMENTS

| | | | |
|---|---|---|---|
| 4,050,914 | 9/1977 | Murphy | 55/387 |
| 4,066,309 | 1/1978 | Helllier | 316/5 |
| 4,071,335 | 1/1978 | Barosi | 55/68 |
| 4,088,456 | 5/1978 | Giorgi et al. | 55/179 |
| 4,101,247 | 7/1978 | Pirota et al. | 417/48 |
| 4,119,488 | 10/1978 | Barosi | 176/68 |
| 4,124,659 | 11/1978 | della Porta et al. | 264/0.5 |
| 4,134,041 | 1/1979 | della Porta et al. | 313/481 |
| 4,137,012 | 1/1979 | della Porta et al. | 417/51 |
| 4,145,162 | 3/1979 | Schiabel | 417/48 |
| 4,145,355 | 3/1979 | Porta et al. | 260/348.34 |
| 4,146,497 | 3/1979 | Barosi et al. | 252/181.6 |
| 4,195,891 | 4/1980 | Hellier | 316/5 |
| 4,214,184 | 7/1980 | Porta et al. | 313/481 |
| 4,229,732 | 10/1980 | Hartstein et al. | 340/378 |
| 4,264,280 | 4/1981 | Hellier | 417/51 |
| 4,269,624 | 5/1981 | Figini | 75/177 |
| 4,306,887 | 12/1981 | Barosi et al. | 55/68 |
| 4,312,669 | 1/1982 | Boffito et al. | 75/177 |
| 4,323,818 | 4/1982 | Madden et al. | 313/481 |
| 4,356,730 | 11/1982 | Cade | 73/517 R |
| 4,486,686 | 12/1984 | della Porta | 313/481 |
| 4,504,765 | 3/1985 | della Porta | 313/481 |
| 4,516,945 | 5/1985 | Martelli | 445/19 |
| 4,535,267 | 8/1985 | Martelli et al. | 313/481 |
| 4,536,677 | 8/1985 | Pirota | 313/481 |
| 4,546,798 | 10/1985 | Porta | 138/149 |
| 4,553,065 | 11/1985 | Pirota | 313/481 |
| 4,628,198 | 12/1986 | Giorgi | 250/213 |
| 4,642,516 | 2/1987 | Ward et al. | 313/481 |
| 4,665,343 | 5/1987 | Ferrario et al. | 313/553 |
| 4,710,344 | 12/1987 | Ward et al. | 419/8 |
| 4,717,500 | 1/1988 | Flach et al. | 252/181.4 |
| 4,728,185 | 3/1988 | Thomas | 353/122 |
| 4,743,167 | 5/1988 | Martelli et al. | 417/51 |
| 4,789,309 | 12/1988 | Giorgi | 417/51 |
| 4,845,268 | 7/1989 | Ohsaka et al. | 560/184 |
| 4,874,339 | 10/1989 | Bratz | 445/28 |
| 4,898,147 | 2/1990 | Doni et al. | 126/200 |
| 4,907,948 | 3/1990 | Barosi et al. | 417/53 |
| 4,938,667 | 7/1990 | della Porta | 417/48 |
| 4,940,300 | 7/1990 | Giorgi | 313/559 |
| 4,943,750 | 7/1990 | Howe et al. | 310/309 |
| 4,951,652 | 8/1990 | Ferrario et al. | 126/200 |
| 4,961,040 | 10/1990 | della Porta et al. | 313/481 |
| 4,990,828 | 2/1991 | Rabusin | 313/546 |
| 5,041,851 | 8/1991 | Nelson | 346/160 |
| 5,061,049 | 10/1991 | Hornbeck | 359/224 |
| 5,079,544 | 1/1992 | DeMond | 340/701 |
| 5,096,279 | 3/1992 | Hornbeck et al. | 359/230 |
| 5,101,236 | 5/1992 | Nelson et al. | 355/229 |
| 5,248,432 | 9/1993 | Williams | 252/51.5 R |
| 5,252,881 | 10/1993 | Muller et al. | 310/309 |
| 5,293,511 | 3/1994 | Poradish et al. | 257/434 |
| 5,331,454 | 7/1994 | Hornbeck | 359/224 |
| B1 3,926,832 | 12/1984 | Barosi | 252/181.6 |

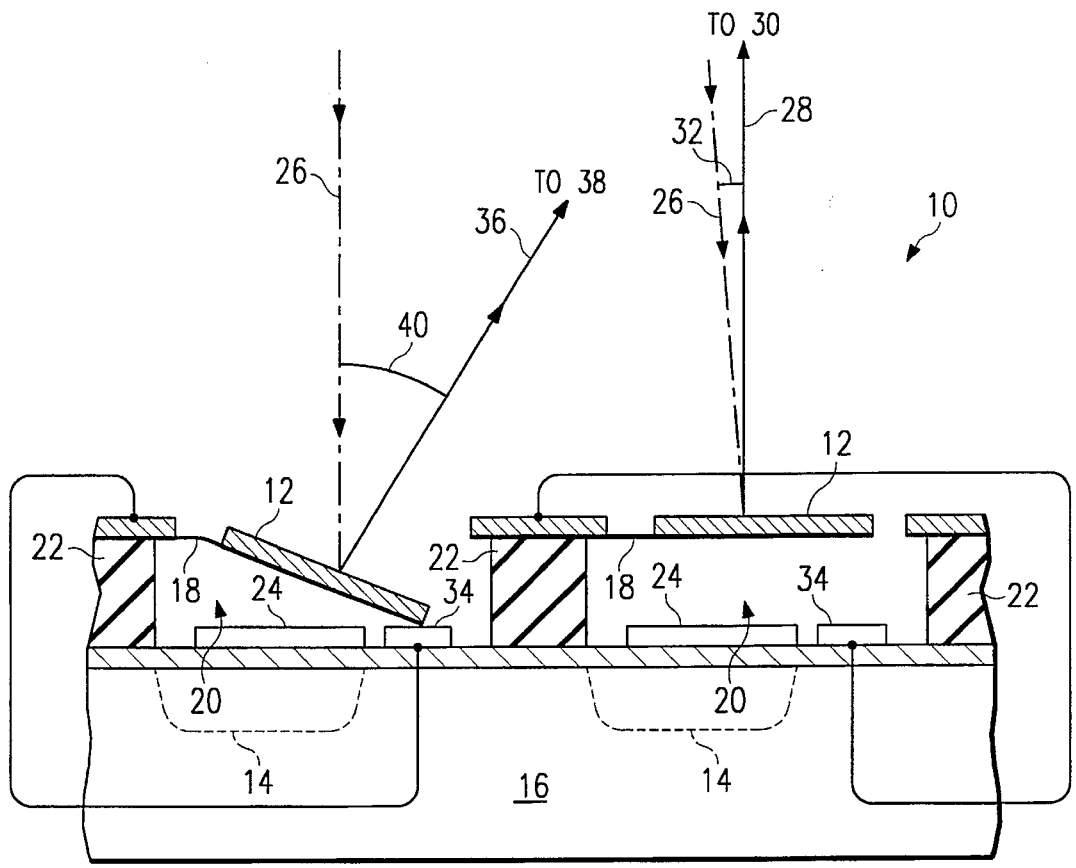
FIG. 1
*(CONVENTIONAL)*
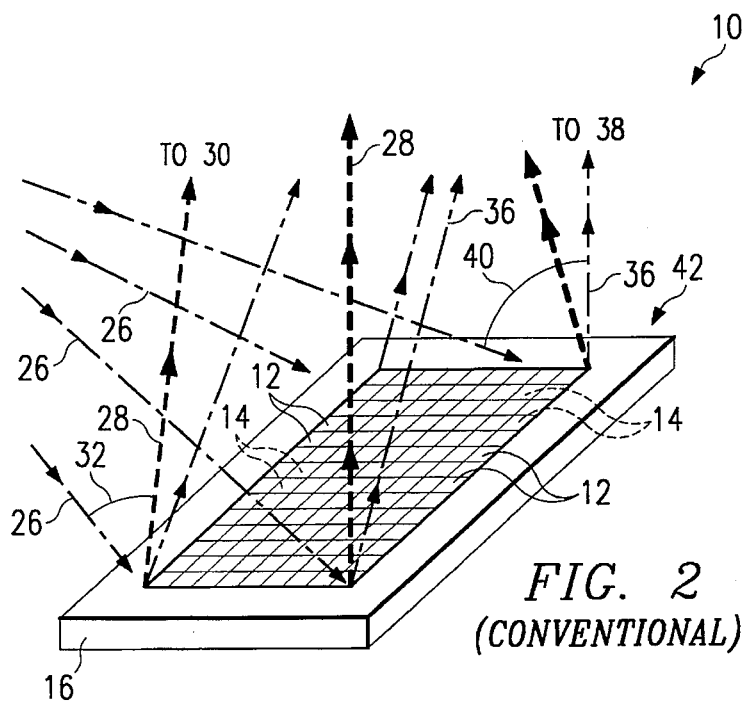
FIG. 2
*(CONVENTIONAL)*

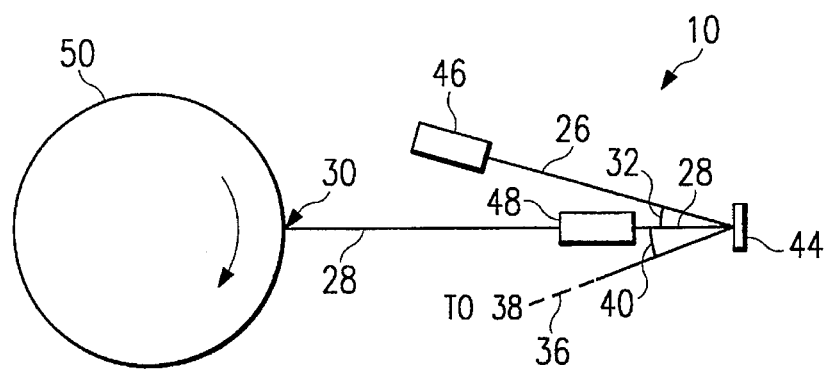
FIG. 3
*(CONVENTIONAL)*

MICRO-MECHANICAL DEVICE WITH NON-EVAPORABLE GETTER

CROSS REFERENCE TO RELATED APPLICATIONS

This application is related to the following commonly assigned, U.S. patent applications:

| SER. NO. | TITLE | FILING DATE |
|---|---|---|
| 08/311,480 | Manufacturing Method for Micromechanical Devices | 08/23/94 |
| 08/239,497 | PFPE Coatings for Micro-Mechanical Devices | 05/09/94 |
| 08/220,429 | Use of Incompatible Materials to Eliminate Sticking of Micro-Mechanical Devices | 03/30/94 |
| 08/216,194 | Polymeric Coatings for Microchemical Devices | 03/21/94 |
| 08/400,730 | Micro-Mechanical Device with Reduced Adhesion and Friction | 03/07/95 Now abandoned |

FIELD OF THE INVENTION

This invention relates to improved micro-mechanical devices and to a method for producing such improved devices. More particularly, the present invention relates to micro-mechanical devices having relatively selectively movable elements which may engage or contact, any tendency of the engaged or contacted elements to stick, adhere or otherwise resist separation being ameliorated or eliminated in the improved device through the use of the method according to this invention. The present invention relates to an improved micromechanical device, including micromechanical devices such as actuators, motors, sensors, and more specifically, a spatial light modulator (SLM), and more particularly, to a packaged SLM of the digital micromirror device ("DMD") variety having improved operating characteristics.

BACKGROUND OF THE INVENTION

SLMs are transducers that modulate incident light in a spatial pattern pursuant to an electrical or other input. The incident light may be modulated in phase, intensity, polarization or direction. SLMs of the deformable mirror class include micromechanical arrays of electronically addressable mirror elements or pixels which are selectively movable or deformable. Each mirror element is movable in response to an electrical input to an integrated addressing circuit formed monolithically with the addressable mirror elements in a common substrate. Incident light is modulated in direction and/or phase by reflection from each element.

As set forth in greater detail in commonly assigned U.S. Pat. No. 5,061,049 to Hornbeck, deformable mirror SLMs are often referred to as DMDs (for "Deformable Mirror Device" or "Digital Micromirror Device"). There are three general categories of deformable mirror SLMs: elastomeric, membrane and beam. The latter category includes torsion beam DMDs, cantilever beam DMDs and flexure beam DMDs.

Each movable mirror element of all three types of beam DMD includes a relatively thick metal reflector supported in a normal, undeflected position by an integral, relatively thin metal beam. In the normal position, the reflector is spaced from a substrate-supported, underlying control electrode which may have a voltage selectively impressed thereon by the addressing circuit.

When the control electrode carries an appropriate voltage, the reflector is electrostatically attracted thereto and moves or is deflected out of the normal position toward the control electrode and the substrate. Such movement or deflection of the reflector causes deformation of its supporting beam storing therein potential energy which tends to return the reflector to its normal position when the control electrode is de-energized. The deformation of a cantilever beam comprises bending about an axis normal to the beam's axis; that of a torsion beam comprises deformation by twisting about an axis parallel to the beam's axis; that of a flexure beam, which is a relatively long cantilever beam connected to the reflector by a relatively short torsion beam, comprises both types of deformation, permitting the reflector to move in piston-like fashion. Thus, the movement or deflection of the reflector of a cantilever or torsion beam DMD is rotational with some parts of the reflector rotating toward the substrate; other parts of the reflector rotate away from the substrate if the axis of rotation is other than at an edge or terminus of the reflector. The movement or deflection of the reflector of a flexure beam DMD maintains all points on the reflector generally parallel with the substrate.

When the reflector of a beam DMD is operated in binary fashion by its addressing circuit, it occupies one of two positions, the first being the normal position which is set by the undeformed beam, the second position being a deflected position. In one of the positions, the reflector reflects incident light to a selected site, such as a viewing screen, the drum of a xerographic printer or other photoreceptor. In the other position, incident light is not reflected to the photoreceptor.

A typical DMD includes an array of numerous pixels, the reflectors of each of which are selectively positioned to reflect or not reflect light to a desired site.

Because a potential difference must exist between the reflector and the control electrode to deflect the reflector, it is undesirable for these two elements to engage. Engagement of a deflected reflector and its control electrode effects current flow therethrough which may weld them together and/or cause the thinner beam to melt or fuse. In either event the functionality of the involved pixel is destroyed. In response to the foregoing problem, a landing electrode may be associated with each reflector. Typically, in the case of a cantilever- or torsion-beam DMD, the landing electrode resides on the substrate at a greater distance from the rotational axis than the control electrode, both distances being taken parallel to the reflector in its normal position. In a flexure-beam DMD, the top of the landing electrode may be elevated above the top of the control electrode. In view of the foregoing, the deflected reflector ultimately engages the landing electrode, but not the control electrode. To prevent damage to the reflector, the landing electrode is maintained at the same potential as the reflector. Again, see commonly assigned U.S. Pat. No. 5,061,049.

Notwithstanding the use of a landing electrode, it has been found that a deflected reflector will sometimes stick or adhere to its landing electrode. Such sticking or adherence may prevent the energy stored in the deformed beam from returning or "resetting" the reflector to its normal position after the control electrode is de-energized. It has been postulated that such sticking is caused by welding or intermolecular attraction between the reflector and the landing electrode or by high surface energy substances sorbed or deposited on the surface of the landing electrode and/or on the portion of the reflector which contacts the landing electrode. Substances which may impart high surface energy to the reflector-landing electrode interface include water vapor and other ambient gases (e.g., carbon monoxide, carbon dioxide, oxygen, nitrogen), and gases and organic components resulting from or left behind following production of the DMD, including gases produced by outgassing from UV-cured adhesives which mount a protective cover to the DMD. Such a protective cover and other DMD "packages" are disclosed in commonly assigned U.S. Pat. No. 5,293,511 entitled "Package for a Semiconductor Device", the teachings of which are incorporated herein by reference.

Sticking of the reflector to the landing electrode has been overcome by applying selected numbers, durations, shapes and magnitudes of voltage pulses ("reset signals") to the control electrode. One type of reset signal attempts to further attract a reflector toward its landing electrode, which the reflector already engages. This further attraction stores additional potential energy in the already deformed beam. When the control electrode is de-energized, the increased potential energy stored in the beam is now able to unstick the reflector from the landing electrode and return the reflector to its normal position. A variant reset signal comprises a train of pulses applied to the control electrode to induce a resonant mechanical wave in a reflector already engaging a landing electrode. De-energizing the control electrode as a portion of the reflector is deformed away from the landing electrode unsticks the reflector. For more details concerning the foregoing and other unsticking techniques, see commonly assigned U.S. Pat. No. 5,096,279 and co-pending patent application Ser. No. 08/311,480, entitled "Manufacturing Method for Micromechanical Devices" filed Sep. 23, 1994, the teachings incorporated herein by reference..

In commonly assigned U.S. Pat. No. 5,331,454 entitled "Low Reset Process for DMD", there is disclosed a technique for passivating or lubricating the portion of the landing electrode engaged by the deformed reflector, and/or the portion of the deformed reflector which engages the landing electrode, so that sticking or adherence therebetween is reduced or eliminated. Passivation is effected by lowering the surface energy of the landing electrode and/or the reflector, which is, in turn, effected by chemically vapor-depositing on the engageable surfaces of interest a monolayer of a long-chain aliphatic halogenated polar compound, such as a perfluoroalkyl acid. This acid is characterized by a chain having an $F_3C$ molecule at a first end, a COOH molecule at the second end, and intermediate $CF_2$ molecules. The COOH end becomes firmly attached to surfaces of the DMD—following pretreatment of such surfaces, if necessary, to achieve same—to present the very low surface energy $F_3C$ and $CF_2$ molecules for engagement. The application of such a compound to at least that portion of the landing electrode which is engaged by a deformed reflector has resulted in an amelioration of the sticking or adhesion problem.

Objects do not easily, if at all, stick or adhere to low energy surfaces, which are also usually expected to be resistant to sorption thereonto of the above-discussed high-surface-energy-imparting substances, such as water vapor. However, while DMDs on which the above-described anti-stick monolayer has been deposited initially exhibit little, if any, reflector-electrode adherence—as evidenced by the low magnitudes of reset signals—after time, higher magnitudes of reset signals are required. Similarly, when protective, light-transparent covers are mounted to DMDs with adhesives, such as UV-cured epoxies, a need to increase the magnitude of reset signals over time has been noted. A similar effect has also been noted in DMDs after several hours of "burn-in." The foregoing suggests that substances—in the first case from the ambient, in the second case outgassed from the adhesive, in the third case outgassed from the DMD—are adhering to or becoming incorporated into the low surface energy anti-stick deposit, possibly due to defects or discontinuities in the films (or coatings) thereof.

Elimination of the sticking phenomenon described above is an object of the present invention.

SUMMARY OF THE INVENTION

With the above and other objects in view, the present invention contemplates a micro-mechanical device having relatively selectively movable elements which may engage or contact, any tendency of the engaged or contacted elements to stick, adhere, or otherwise resist separation being ameliorated or eliminated. The present invention contemplates an improved micromechanical device, including micromechanical devices such as actuators, motors, sensors, and more specifically, a spatial light modulator (SLM), and more particularly, to a packaged SLM of the digital micromirror device ("DMD") variety having improved operating characteristics. The present invention contemplates a micromechanical device, such as a spatial light modulator of the DMD type described above, in which the tendency of a deflected movable element and a control electrode to adhere or stick is reduced or eliminated.

At least the portion of the control electrode which is contacted by the deflected mirror element is coated with a deposit of a surface energy-decreasing compound. Preferably the compound is a long-chain aliphatic halogenated polar compound, such as a perfluoroalkanoic acid, although other non-stick passivation films are suitable. A package, which may be hermetic, encloses the DMD, and a getter is located within the package. Preferably the getter is one which is specific to water, larger organic molecules, various gases, and other high surface energy substances. The getter is a non evaporable getter (NEG) which may be an alloy of zirconium, including zirconium-vanadium-iron (Zr-V-Fe), zirconium-aluminum (Zr-Al), zirconium-iron (Zr-Fe), and zirconium nickel (Zr-Ni). The NEG getter may be porous, that is present in a form which has a high surface area to volume ratio. The getter may be deposited as a film residing either on the interior surfaces of the package and/or on those portions of the DMD.

Placing the non-evaporable getter in the package permits the use of active metal getter systems without their evaporation on package surfaces. Use of a NEG is particularly compatible with the current DMD/Micromachine processing methodology, which requires low temperature processing. The NEG getters have been included in the package preferably by placing the activated getter in pellet form into a designated pocket within the package. The getter pellet is activated by heating in an inert atmosphere, and transferred to the package so as to preserve the gettering properties. The transfer could occur, for example, by keeping the activated getter pellet in a dry, inert atmosphere (such as Argon) which can be easily produced in a conventional dry box. Care is taken in the design of the getter "pocket" so as to avoid particle generation due to pellet flaking, etc. Alternatively, the getter may be activated "in-situ" by heating with a resistive element. Care must be taken in this case to avoid thermally induced damage to the device.

BRIEF DESCRIPTION OF THE DRAWINGS

FIG. 1 is a generalized, sectioned side view of a portion of a DMD;

FIG. 2 is a generalized perspective view of an area array or matrix of DMDs of the type depicted in FIG. 1;

FIG. 3 schematically illustrates a printing system utilizing a linear matrix or array of DMDs of the type depicted in FIG. 1.

DETAILED DESCRIPTION

Figure 4:
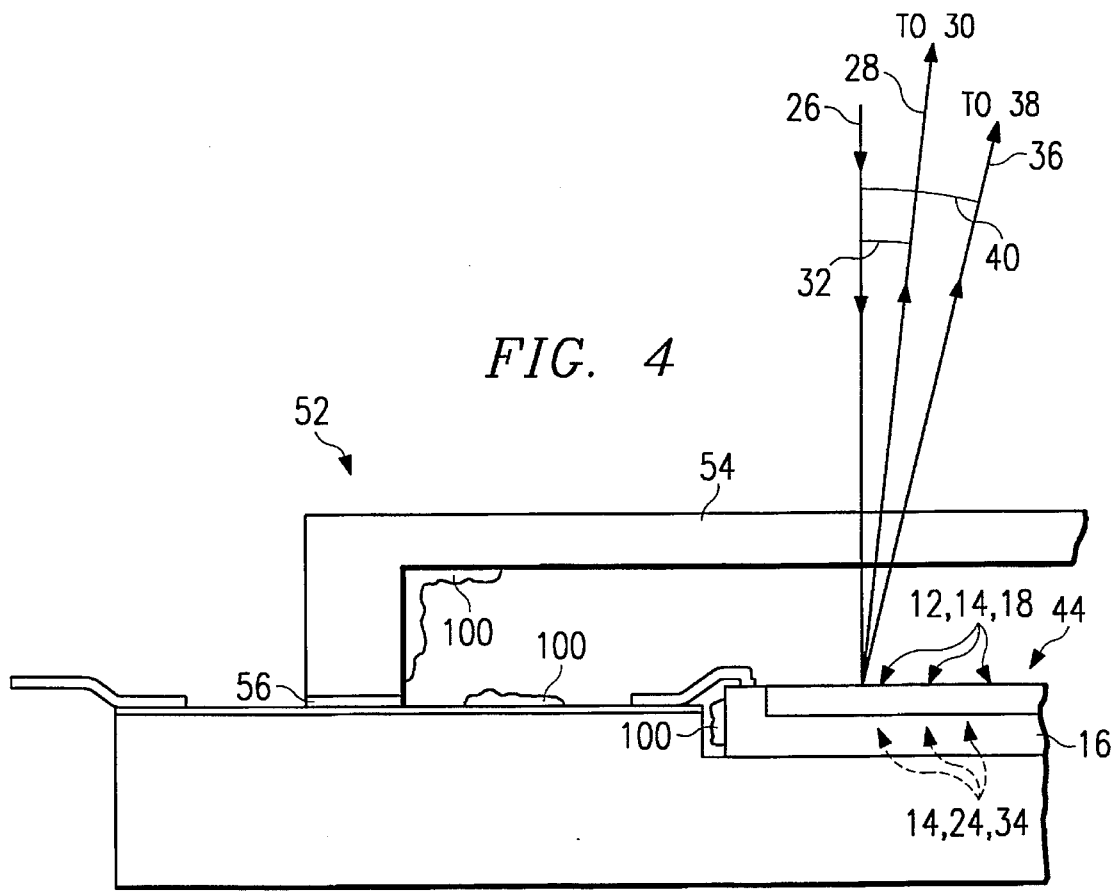
FIG. 4 illustrates a portion of a packaged array of DMDs of the type shown in FIGS. 2 or 3, the performance and operation of which are improved according to the principles of the present invention using a non-evaporable getter (NEG).

Referring first to FIG. 1, there are shown two adjacent, individual DMDs 10, which may be of the type shown in commonly assigned U.S. Pat. Nos. 5,061,049 to Hornbeck and 3,600,798 to Lee. The DMDs 10 may also be similar to those shown in U.S. Pat. Nos. 4,356,730 to Cade, 4,229,732 to Hartstein et al, 3,896,338 to Nathanson et al, and 3,886,310 to Guldberg et al. The above types of DMDs 10 may be used in systems such as those shown in commonly assigned U.S. Pat. Nos. 5,101,236 to Nelson et al, 5,079,544 to DeMond et al, 5,041,851 to Nelson, and 4,728,185 to Thomas. In the following Description, the DMDs 10 are described as operating in a bistable or digital mode, although they may be operated in other modes, such as tristable or analog.

As generally depicted in FIG. 1, each DMD 10 includes a relatively thick and massive, metal or metallic light-reflective, movable or deflectable mirror element 12 and associated addressing circuits 14 for selectively deflecting the mirror elements 12. Methods of monolithically forming the mirror elements 12 and the addressing circuits 14 in and on a common substrate 16 are set forth in the above-noted patents. Typically, each mirror element 12 deflects by moving or rotating up and down on one or more relatively thin, integral supporting beams or hinges 18. Although FIG. 1 illustrates a single cantilever beam 18, the mirror element 12 may be supported by one or more torsion beams or flexure beams, as discussed earlier.

Undercut wells 20 are defined between columnar members 22, which may comprise residual photoresist remaining on the substrate 16 after functioning as a portion of a etching, deposition, and/or implantation mask during the formation of the DMD 10. Each beam 18 is supported by one member 22. Each well 20 accommodates the deflection of its associated mirror element 12 by permitting it to move toward the substrate 16, as shown at the left in FIG. 1, from an undeflected position, shown to the right in FIG. 1. Deflection of each mirror element 12 is effected by the attractive electrostatic force exerted thereon by an electric field resulting from a potential applied to an associated control electrode 24 in its well 20 and on the substrate 16. The potential is selectively applied to the control electrode 24 by its addressing circuit 14.

In FIG. 1, when a beam 18 is undeformed, it sets the normal position of its mirror element 12, as shown at the right in FIG. 1. Light along a path 26 which is incident on the device 10 when a mirror element 12 is in its normal position is reflected thereby along a path, denoted at 28, to a first site, generally indicated at 30. An angle 32 is defined between the paths 28 and 30.

When an addressing circuit 14 applies an appropriate potential to its control electrode 24, its mirror element 12 is electrostatically attracted out of its normal position toward the control electrode 24 and the substrate 16. The mirror element 12 accordingly moves or deflects until it engages a landing electrode 34, as shown at the left in FIG. 1, and resides in its deflected position. The use of the landing electrode 34 is recommended by the aforenoted '279 patent. Specifically, the landing electrode 34 serves as a mechanical stop for the mirror element 12, thus setting the deflected position thereof. Further, the engagement of the landing electrode 34 and the mirror element 12 prevents the mirror element 12 from engaging the control electrode 24. Because of the potential difference between the mirror element 12 and the control electrode 24, such engagement would result in current flow through the mirror element 12. Current flow of this type is likely to weld the mirror element 12 to the control electrode 24 and/or to fuse or melt the relatively thin beam 18.

In the deflected position of the mirror element 12, the incident light on the path 26 is reflected along a path 36 to a second site 38. An angle 40 is defined between the paths 26 and 36. In the present example, the angle 32 is smaller than the angle 40.

The first site 30 may be occupied by a utilization device, such as a viewing screen or a photosensitive drum of a xerographic printing apparatus. The light 36 directed to the second site 38 may be absorbed or otherwise prevented from reaching the first site 30. The roles of the sites 30 and 38 may, of course, be reversed. In the foregoing way, the incident light 26 is modulated by the DMDs 10 so that it selectively either reaches or does not reach whichever site 30 or 38 contains the utilization device.

FIG. 2 generally depicts an area array 42 of the DMDs 10 shown in FIG. 1. FIG. 3 depicts a linear matrix or array 44 of the DMDs 10 shown in FIG. 1. In FIG. 3, the incident light 26 is emitted from a suitable source 46 and is reflected along either the path 28 or the path 36. The path 28 directs the reflected light through a lens 48 to the surface of a photosensitive drum 50 of a xerographic printing apparatus (not shown). The reflected light traversing the path 36 does not reach the drum 50 and may be directed onto a "light sink" whereat it is absorbed or otherwise prevented from reaching the drum 50 or otherwise affecting the light traversing the paths 26 and 28.

When the mirror element 12 is in its deflected position and engages its landing electrode 30, its beam 18 is deformed and, accordingly, stores energy therein which tends to return the mirror element 12 to its normal position. In theory, when the control electrode 24 is de-energized by the addressing circuit 14, the stored energy will return the mirror element 12 to the normal position. As discussed in commonly assigned U.S. Pat. No. 5,096,279 and in commonly assigned U.S. Pat. No. 5,331,454, either or both portions of the mirror element 12 and the landing electrode 34 which are engaged during deflection of the former may become intermetallically welded or otherwise stick or adhere due to their possessing high surface energy. Such high surface energy may result from substances deposited or sorbed onto the engaged portions. Simple de-energization of the control electrode 34 may not result in the mirror element 12 returning to its normal position if the mirror element 12 and the landing electrode 34 stick or adhere. The foregoing '279 patent and co-pending patent application Ser. No. 08/311,480, filed Sep. 23, 1994, entitled "Manufacturing Method for Micromechanical Devices", disclose a technique for applying the previously described special reset signals to the control electrode 24 which overcome the sticking or adhering together of the mirror element 12 and the landing electrode 34.

U.S. Pat. No. 5,331,454 discloses a technique for depositing the previously described long-chain aliphatic halogenated polar compound as a low surface energy material on the engageable portions of the mirror element 12 and the landing electrode 28. The low surface energy material discourages the aforenoted sticking or adherence problem.

It has been found that notwithstanding the implementation of either or both of the techniques of the '279 patent and the '454 patent the mirror elements 12 and landing electrodes 28 of DMDs 10 may stick or adhere together. It is postulated that high surface energy substances in the ambient either remain after deposition of, or become sorbed or attached to faults in, the low surface energy material of the '454 patent. An initial propounded solution was to enclose the DMD 10 in a package 52 comprising the DMD 10 and its substrate 16 using a light-transparent cover 54. The cover 54 was hermetically mounted to the substrate 16 by an adhesive, a soft metal or a frit, collectively designated at 56.

It was found that, even with the use of the hermetic cover 56, the DMDs 10 of the package 52 exhibited sticking or adherence, which, in some cases, worsened over time or following burn-in of the DMD 10. It was postulated that, in addition to the above-noted sources of high surface energy substances, the adhesive, etc. 56 was outgassing additional high surface energy substances into the package 52. Again, faults or defects in the deposited low surface energy material of the '454 patent were theorized to act as attachment or sorption sites for any and all such high surface energy substances.

An understanding of the details of the characteristics and operation of DMDs 10, and an analysis of data showing worsening of the sticking problem over time led to the conclusion that a getter 100, shown in FIG. 4, should be included in the package 52. A variety of getters 100 have been utilized with success. These getters 100 include those that are specific to water, to large organic molecules, to various gases (e.g., carbon monoxide, carbon dioxide, $O_2$, $H_2$ and $N_2$) and to other volatile components. Getters 100 having a high surface area to volume ratio, achieved, for example, by being rendered porous, have been used with success.

The getters 100 are preferably non-evaporable getters (NEGs). A NEG is a material, typically consisting of metal alloys, which has the property that, after suitable preparation, reactive gaseous species present within the sealed package ambient will chemically absorb to the surface and thus be effectively removed from the ambient. The term "suitable preparation" refers to making the NEG chemically "active" (activation) so that the chemical reaction with ambient gaseous species will occur with the NEG surfaces. Generally, NEG surfaces are rendered "active" by an initial heating treatment. If the NEG is not "activated", then the NEG will not produce the desired effect.

Suitable getters 100 have been found to be zirconium based alloys, including: Zr-Al, Zr-Fe, Zr-V-Fe and Zr-Ni which are commercially available from SAES Getters of Italy. Zr-based alloys are commercially available in a manner which provides a porous surface (i.e. high surface area). The Zr-V-Fe alloys may be the most useful because of the wide spectrum of species which are gettered by the material. Zr-Ni sintered powder is another alternative where the powder provides a high surface area in a form that is different that that of a porous bulk. Other non-evaporable getter materials may include porous Ti, Zr-C (graphite), and Th.

Of course, different getters can be used together to effectively control the device ambient. A silicate might be used to handle water, and a NEG to getter organics. Thus, the performance of such a getter "system" would result in a more complete control of the device ambient over that from employing one type of getter alone.

The getters 100 are preferably non-evaporable getters (NEGs) which have been included in the package 52 preferably by placing an activated getter in pellet form into a designated pocket within the package. The getter pellet is activated by heating in an inert atmosphere, and transferred to the package so as to preserve the gettering properties. The transfer could occur, for example, by keeping the activated getter pellet in a dry, inert atmosphere (such as Argon gas) which can be easily produced in a conventional dry box. Care is taken in the design of the getter "pocket" so as to attach the getter and avoid particle generation due to pellet flaking, etc. "Attachment" of the NEG means placing the NEG in the package in a stationary manner. This is done by designing an area in the package to hold the getter in place, for example. The point here is that the NEG should not move about and thus avoid particle generation or mechanical failure in the case of DMDs. If the NEGs are permitted to fracture, say by unconstrained movement in the package, particles would be generated. For this reason a package which permits the NEG to remain stationary through handling is utilized. Evaporated getter surfaces could flake and provide a particle problem for the device. Molecular sieves are known to be quite brittle, and have a relatively poor gettering ability for a wide spectrum of gaseous species expected to be in a package, such as N2, H2O, H2, O2, CO, CO2, etc., particularly at or above room temperature.

Activation is achieved by sufficiently heating the NEG to remove the chemical passivation layer on its surface. Essentially, activation is performed by heating the NEG. This can be done "externally", i.e. placing the NEG in a hot ambient, such as an oven equipped with the ability to control the atmosphere surrounding the NEG. This could conceivably also be done "internally", i.e. encasing a refractory metal filament, like W, with the NEG material and passing current through the filament. This would cause the W filament to heat up which in turn would heat the NEG. Such a method of heating is provided commercially by SAES, albeit for a macroscopic system. Scaling this down to a IC package dimension should be feasible. For Zr-V-Fe alloys, the temperature of activation is about 450° C. Once "activated", the NEG (perhaps in pellet form) must be transferred to the package in an inert atmosphere to avoid unintentional, premature reaction of the NEG. The package would then be sealed, perhaps hermetically. It is important to note that all getters will eventually "saturate", that is, all of the available surface sites will eventually react with a gaseous species and thereby render that site inert or inactive. This is the reason for the limiting capacity of any getter. The getter could be made active again by undergoing a "re-activation" process such as that described above for "activation". By making the package hermetic, i.e. a low leak rate between the package interior and the external ambient exists, the getter could be rendered useful for many years.

Also, if the getter could be heated in the package, the species which have reacted on the surface could diffuse into the bulk of the getter, thus rendering the surface active again for more gettering activity. This is another way to increase the "capacity" of the getter.

The difference between NEGs and getters which require evaporative deposition is that the evaporation step is eliminated. In the evaporable getters, higher temperatures are required to essentially sublime the getter metal, which renders the metal active onto line-of-sight surfaces, and which metallically contaminates the passivation layer on the landing surfaces. Metallic contamination refers to unwanted metal deposition resulting from evaporation of a metal getter material inside the package. Such contamination could result in, for example, electrical short circuits or potential catalytic chemical reactions with the coatings/sealants, which would otherwise not occur. The NEG would be more similar to a "sponge" in that unwanted deposition of getter material on surfaces is avoided.

It is preferred that the portions of the mirror element 12 and the landing electrode 34 which engage be coated (passivated) with the materials disclosed in commonly assigned U.S. Pat. No. 5,331,454 entitled "Low Reset Voltage Process for DMD", incorporated herein by reference. Specifically with a long-chain aliphatic halogenated polar compound, such as a perfluoroalkanoic acid of the general formula $F_3C(CF_2)_xCOOH$, where X is preferably 10 or more, for example 10, 12, 14, 16 or 18. The COOH moiety provides a good "anchor" to the surfaces of the DMD 10 which carry the material, while the free end or remainder of each molecule provides low surface energy which discourages sticking of the mirror element 12 to the landing electrode 34. The attachment of the COOH moiety may be enhanced by appropriate pretreatment of the surfaces of the DMD. The passivating material is preferably deposited by chemical vapor deposition, as set forth in the aforenoted patent. Lubricants are chosen which do not exhibit a propensity to desorb . . . i.e. they are non-volatile, to maintain the passivating material. If surface passivants (lubricants) were placed on the DMD surfaces which physically touch and are volatile, they would desorb into the package ambient. Once desorbed, they are gettered by the active NEG. Thus, the lubricant would effectively be removed from the surfaces that were originally intended to be lubricated.

The use of the NEG getters according to the present invention enhances the anti-stick properties of the passivating material by counteracting the effects of high surface energy substances which would otherwise reside on or in the material. Placing a non-evaporable getter in the package permits the use of active metal getter systems without their evaporation and contamination on package surfaces. Use of a NEG is particularly compatable with the current DMD/micromachine processing methodology, which requires low temperature processing. Similarly, use of an NEG inside the package of other types of micro-mechanical devices, which may also have contacting members, is expected to reduce surface contaminants and improve performance of any lubricants which are used.

Those skilled in the art will appreciate that the foregoing description sets forth only preferred embodiments of the present invention and that various modifications and additions may be made thereto without departing from the spirit and scope of the present invention. For instance, the present invention is applicable in all packaged micro-mechanical devices including actuators, motors, sensors etc.

What is claimed is:

1. A micro-mechanical device including a first element selectively movable relative to a second element, portions of the elements contacting in one position of the first element, the device comprising:

(a) a deposit of a surface energy-decreasing material on at least that portion of the second element which is engageable by the portion of the first element;

(b) a package enclosing the device; and (c) a non-evaporating getter within the package, wherein said non-evaporating getter is an active metal based alloy.

2. A device as in claim 1, wherein:

the getter is specific to water, to larger organic molecules, or to carbon monoxide, carbon dioxide, oxygen or nitrogen.

3. A device as in claim 2, wherein:

the getter is specific to larger organic molecules.

4. A device as in claim 2, wherein:

the getter is specific to water.

5. A device as in claim 1 wherein:

the getter has a high surface area to volume ratio.

6. The device as in claim 1, wherein:

the non-evaporating getter includes one or more of Zr-Al, Zr-Fe, Zr-V-Fe or Zr-Ni.

7. A device as in claim 1, wherein:

the getter is deposited as a film.

8. A device as in claim 7, wherein:

the film resides on a portion of the device other than the portions of the first element and the second element which are engageable.

9. A device as in claim 1, wherein:

the package is hermetic.

10. A device as in claim 1, wherein:

the second element is a landing electrode maintainable at the same electric potential as the first element.

11. A device as in claim 1, wherein:

the material is a long-chain aliphatic halogenated polar compound.

12. A device as in claim 11, wherein:

the compound is a perfluoroalkanoic acid of the general formula $F_3C(CF_2)_xCOOH$.

13. A device as in claim 12, wherein:

X is 10 or more.

14. A device as in claim 13, wherein:

X is 16.

15. A device as in claim 12, wherein:

the compound is vapor deposited as a film containing defects which serve as sites for the adhesion of water vapor and other high surface energy substances;

the package encloses the device via a package-device interface which contains a sealant, the sealant outgassing and permitting the passage therethrough of water and the other high surface energy substances; and the getter is specific to water and to the other high surface energy substances.

16. A DMD of the type which includes a movable mirror element having a normal position set by a deformable beam in its undeformed state and a deflected position in which the beam is deformed and a portion of the mirror element engages a portion of a stationary member, deformation of the beam storing energy therein which tends to return the mirror element to the normal position, the mirror element being selectively electrostatically attractable into its deflected position; the DMD comprising:

a package enclosing the DMD; and a non-evaporating getter within the package, wherein said non-evaporating getter is an active metal based alloy.

* * * * *